(No Model.)
J. F. ALLISON.
FISH TRAP.
No. 439,991. Patented Nov. 4, 1890.
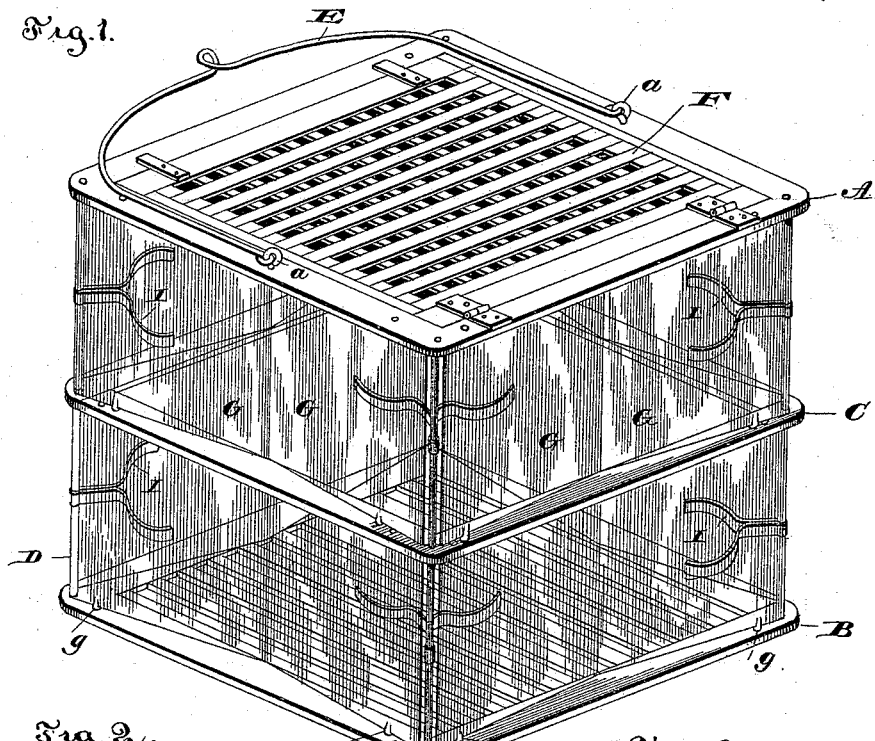
Fig. 1.
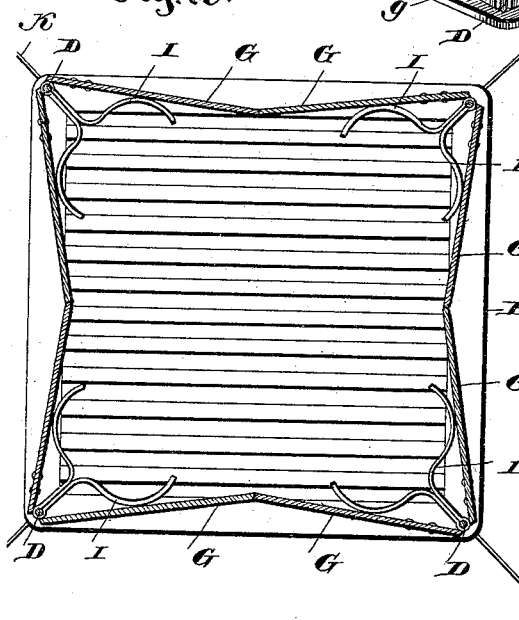
Fig. 2.
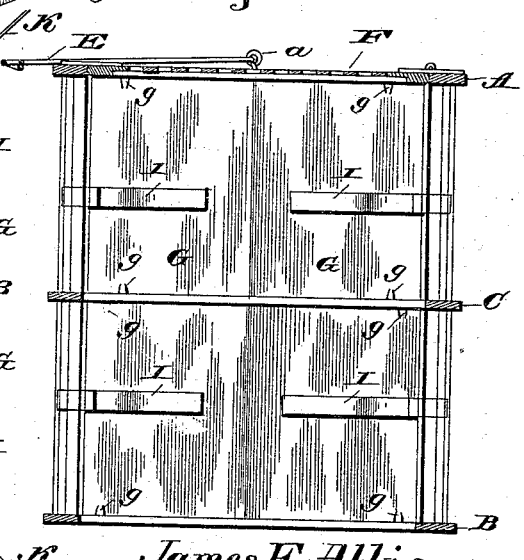
Fig. 3.
Witnesses
John Imirie
E. W. Johnson
James F. Allison.
Inventor
Attorney

UNITED STATES PATENT OFFICE.

JAMES F. ALLISON, OF DETROIT, ALABAMA.

FISH-TRAP.

SPECIFICATION forming part of Letters Patent No. 439,991, dated November 4, 1890.

Application filed June 26, 1890. Serial No. 356,855. (No model.)

*To all whom it may concern:*

Be it known that I, JAMES F. ALLISON, a citizen of the United States of America, residing at Detroit, in the county of Lamar and State of Alabama, have invented certain new and useful Improvements in Fish-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in fish-traps, the object thereof being to provide a trap which may be used for catching either large fish or minnows for bait, or amphibious animals—as musk-rats, &c.; and it consists in a trap which is made up of a frame consisting of top and bottom pieces suitably connected to each other by corner-posts, to which frame are attached doors of transparent material—as glass—which are normally held closed by springs attached to the corner-posts, so as to bear upon the doors, as will be hereinafter fully set forth, and particularly pointed out in the claims.

In the accompanying drawings, forming part of this specification, Figure 1 is a perspective view. Fig. 2 is a horizontal sectional view, and Fig. 3 a vertical section.

A refers to the top frame; B, the bottom frame, and C a central frame, which divides the trap into two compartments, as shown. The horizontal frames A, B, and C are connected to each other by corner-posts D, through which pass suitable pins for holding the frames apart. The upper frame A is provided with eyes $a$, with which engages a bail E, from which the trap can be suspended. This frame A is also provided with a hinged door F, which can be held closed by a suitable hook or fastening.

G G refer to gates, which are preferably made of glass, and have formed thereon lugs or projections $g$, which form pintles which lie within perforations formed in the horizontal sections, so that said doors may open and close. If desirable, these doors may abut against each other or against stops carried by the horizontal sections. The doors are held closed by springs I, which are preferably made up of a single piece of metal, and are attached to the corner-posts D.

In capturing minnows the bait may be suspended from the hinged cover, and the fish pressing against the hinged doors will open the same and pass in, when the doors will immediately assume their closed position.

If desired, this trap may be used in connection with wings K K, which extend outwardly from the corners thereof.

I am aware that prior to my invention it has been proposed to provide a fish-trap with pivoted doors made up of wire; and I do not claim such as my invention, as said doors in my opinion are objectionable, as they are visible to the fish, whereas by providing transparent doors said obstructions are not visible, and the fish, not seeing the obstructions, will exert a sufficient force against the door to open the same.

Having thus described my invention, what I claim as new, and desire to secure by Letters Patent, is—

1. In a fish-trap, the combination of a rectangular frame having the vertical corner-posts, glass doors arranged in pairs on each side and hinged to the corner-posts, and springs secured to said frame and bearing against the inner sides of said doors to normally hold the same closed, substantially as set forth.

2. In combination with a frame having vertical corner-posts, glass doors arranged in pairs at each side and hinged to the corner-posts, and wings K, extending outwardly from the corners of the frame together with a bail secured to the latter, substantially as set forth.

3. In a fish-trap, the combination of a rectangular frame having a bottom and hinged top, transparent doors arranged in pairs on each side of the frame, springs I, made up of a single piece of spring metal rigidly secured to the corner-posts, so that the spring members of the same will abut against the pivoted doors, substantially as set forth.

In testimony whereof I affix my signature in presence of two witnesses.

JAMES F. ALLISON.

Witnesses:
JOHN V. GREGORY,
JEFFERSON E. FREDERICK.